Nov. 9, 1954  R. BAADER  2,693,872
MECHANICAL HANDLING OF FISH
Filed Dec. 20, 1951
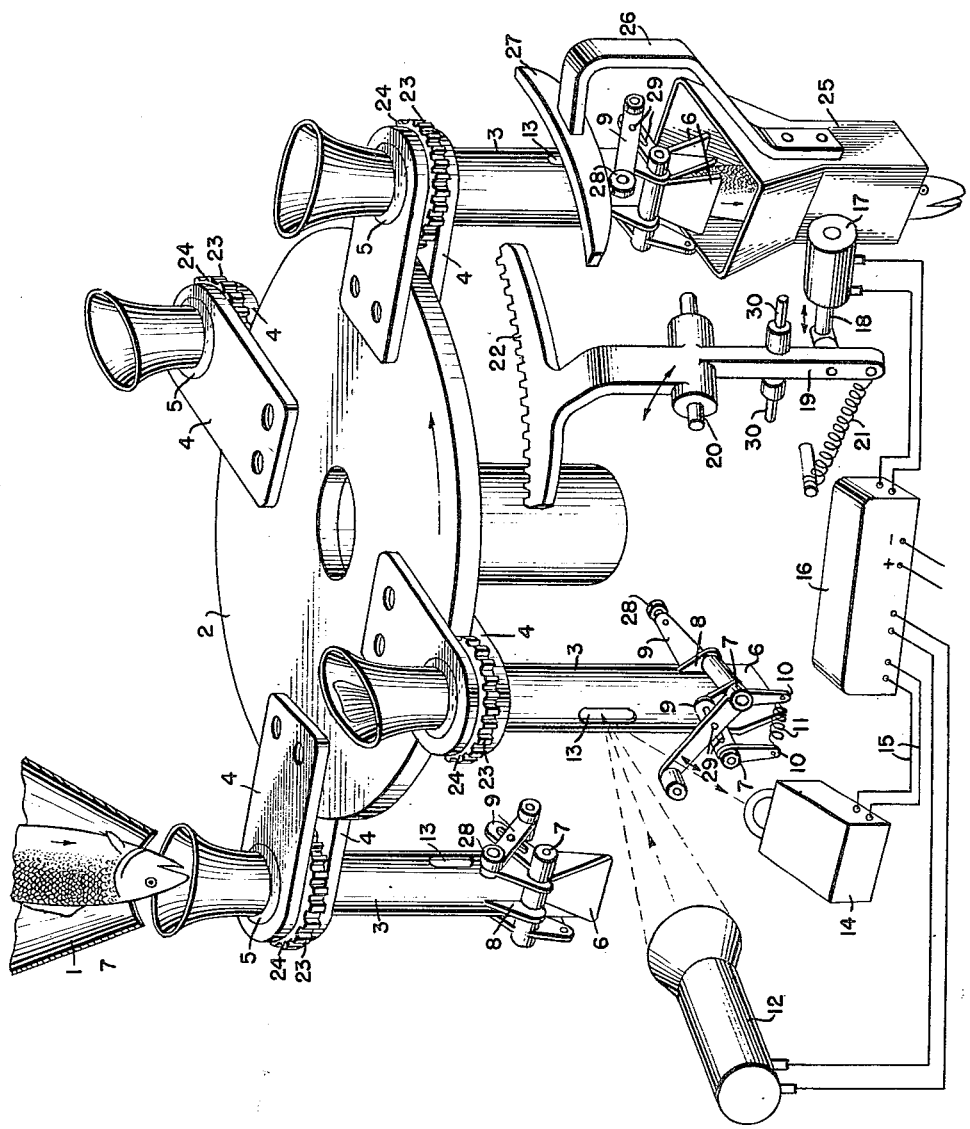
INVENTOR
Rudolf Baader
BY *Richards & Geier*
ATTORNEYS

United States Patent Office 2,693,872
Patented Nov. 9, 1954

2,693,872

MECHANICAL HANDLING OF FISH

Rudolf Baader, Lubeck, Schleswig-Holstein, Germany; Rudolf Fahrig, Lubeck, Germany, executor of said Rudolf Baader, deceased, assignor to Nordischer Maschinenbau Rudolf Baader, Lubeck, Germany, a German firm Application December 20, 1951, Serial No. 262,531

9 Claims. (Cl. 198—33)

This invention relates to the treatment of fish.

In the mechanical dressing of fish it is usually essential to supply the fish one by one with all their backs facing in the same direction, which may either be towards or away from any particular tool. The common practice is to put the fish in the right position as it is loaded into the machine by hand. Now the capacity of a high speed dressing machine is limited by the ability of the operator to handle the fish, and the need to turn some of the fish round decreases the number of fish which the operator can feed into a machine in a given time. Accordingly any method by which fish supplied one by one with either the back or belly facing a given direction are conveyed onwards with all their backs facing in the same direction, and so more conveniently presented to an operator, enables more fish to be dressed in a given time. Such a method may also be used as part of a complete mechanical fish dressing system.

It is an object of this invention to provide an improved method of turning through 180° those fish which are not facing a desired direction.

It is another object of the invention to provide means by which fish having their backs facing the wrong direction are turned through 180° to face the right direction.

It is a further object of the invention to take advantage of the different surface characteristics of the back and belly of a fish in order to control a turning mechanism automatically.

Other objects will appear hereinafter.

In this invention use is made of the different effects produced by the impingement of light or other waves upon the back or belly of the fish as the case may be. It is preferred to cause light rays to strike the back or belly of the fish as the case may be; these rays are reflected to a greater or less extent by the belly or back of the fish, and the greater amount of light reflected by the belly is utilised to actuate a photocell, which is electrically connected to control a turning mechanism.

The invention will be more clearly understood by reference to the annexed drawing, which shows diagrammatically one apparatus according to the invention.

The purpose of the apparatus shown is to feed herrings or other fish one by one to a fish-dressing machine with the backs of all the fish facing the same direction. The fish arrive at the apparatus by way of a hopper 1, into which they can be fed very rapidly nose-first either by hand or mechanically. The mouth of the hopper is elliptical, so that each fish will pass through the mouth only with either its back or its belly facing outwards, but it is an even chance whether the back or the belly will be so facing.

The apparatus consists essentially of a rotary structure 2 carrying four fish-holding tubes 3 which are supported by brackets 4 projecting radially from the table. Each tube 3 is elliptical in cross-section and has two circular collars 5 which are keyed to turn in circular openings in the brackets 4 so that the tube as a whole can turn about its vertical axis in these brackets. The end of each tube is closed by means of two flaps 6 fixed to spindles 7 which can turn in brackets 8 secured to the tube. A bell crank 9 is fixed to one end of each spindle 7 and another bell crank 10 is fixed to the opposite end of each spindle. There are therefore two identical pairs of bell cranks, and in each pair the bell cranks 9 and 10 are connected by a pin-and-slot connection 29. Moreover, the two bell cranks of each pair are joined by a spring 11, the effect of which is to rock them in such a way as to urge the flaps 6 together and so to close the lower end of the tube 3.

As each tube 3 enters the position shown at I in which it is beneath the hopper 1 it receives a fish, which drops downwards until its snout encounters the closed flaps 6. The tube is then carried by the table 2 to the position shown at II. This is the detecting position and in it rays from a light transmitter in the form of a lamp 12 pass through an opening or window 13 in the tube and are largely absorbed by the fish if its back is facing the window. If, however, its belly is facing the window the rays are largely reflected to a detector constituted by a photocell device 14, and as a result a current flows through leads 15 to an electric control device 16, and through an appropriate relay and amplifier in the device 16 a corresponding current is transmitted to an electromagnet 17. This electromagnet is mounted to attract an armature 18 which forms part of the turning mechanism and which projects from a double-armed lever 19 mounted to rock about a fixed shaft 20 against the action of a spring 21. Thus, if as a result of reflection the light rays fall on the belly of the fish, the electromagnet 17 is actuated and attracts the armature 18, the lever 19 rocks against the spring and a toothed rack 22 on its upper end is rocked inwards towards the table 2. This rocking brings the rack 22 into position to engage teeth 23 on a circular collar 24 which is rigid with the tube 3 and lies between the two brackets 4. This engagement occurs as the tube is moving from the position II to position III and as a consequence of it the tube is turned through exactly 180°. This turning, it will be appreciated, occurs only if it is the belly of the fish which is visible through the window 13; if the back of the fish is facing the window the electromagnet 17 is not actuated and the lever 19 is not rocked, so that the teeth 23 pass by the rack 22 without engaging it. The result is that when the tube reaches the position III every fish has its back facing outwards.

The lever 19 carries a pin 30 which projects both forwards and backwards from the lever and by engagement with stops (not shown) serves to limit its movement in both directions. When the lever 19 is turning against the spring 21 the right-hand end of the pin 30 encounters one stop just as the rack 22 is in the proper position to engage the teeth 23. When the lever 19 is moving in the opposite direction the left-hand end of the pin 30 encounters the other stop before the spring 21 can pull the armature 18 right out of the electromagnet 17.

It will be appreciated that the photocell device must be highly sensitive since it must respond to small differences in the amount of reflected light. Naturally the tubes 3 must themselves absorb and not reflect light.

In the position III the tube lies immediately above a fixed discharge hopper 25 by which the fish is fed to the fish-dressing machine (not shown). The hopper 25 carries a bracket 26 extending upwardly and in turn carrying a cam 27. This cam engages a roller 28 on whichever of the bell cranks 9 is at that instant lying radially outwards of the tube. As a result of this engagement the bell crank 9 is rocked and through the connection 29 rocks the corresponding bell crank 10 and so opens both flaps 6. The fish thereupon drops down the hopper 25 with its back facing outwards.

A tube which has been turned through 180° as described can, if desired, be turned back by similar action in passing through the position IV on its way back to the position I. However, the need for turning the tube at all can be avoided by providing each tube with two windows 13 diametrically opposite to one another so that always one window will be exposed to the rays of light from the lamp 12 when the tube enters the position II.

Since the fish to be handled are likely to vary in size, blade springs or the like may be provided in the tubes 3 to urge them against the wall in which the window 13 is made or, if there are two windows in opposite walls, against one of those walls.

The invention is not limited to the apparatus shown.

As a minor variation, a time delay may be provided in the control device 16 so that the rack 22 is moved only just as the teeth 23 reach it. Again, the fish need not be in a holder when the waves impinge on them, but may be on a conveyor and be engaged by a gripping device if they are to be turned through 180°. Moreover, the fish need not be at rest in relation to either a holder or a conveyor when the waves impinge on them, but rather may be sliding down a chute or falling through a tube. In general, the axis of a holder for the fish may be vertical, horizontal or inclined.

Further, the invention is not limited to the use of light rays. Since the back and belly of a fish differ not only in colour but also in the nature of their surfaces, electric waves of very short wave lengths can be caused to impinge on the fish and will be differently reflected by it according as the back or belly is facing the transmitter.

I claim:

1. In a fish-treating apparatus, in combination, means for supplying fish one by one with either the back or belly facing a given direction, said means including a gear element, wave transmitting means for directing waves onto each of said fish, whereby different effects are produced according as said waves impinge on the back or belly of the fish, detecting means responsive to one of said different effects, and means controlled by said detecting means and having teeth adapted to engage said rack for turning through 180° all of said fish having their backs facing one direction, whereby thereafter the backs of all the fish face the same direction.

2. In a fish-treating apparatus, in combination, means for supplying fish one by one with either the back or belly facing a given direction, said means including a gear element, wave transmitting means for directing light waves onto each of said fish to be reflected to a greater or less extent by the belly or back of the fish, light-sensitive means responsive to the greater amount of light reflected by a fish belly, and means controlled by said light-sensitive means and having teeth adapted to engage said rack for turning through 180° all of said fish having their backs facing one direction, whereby thereafter the backs of all the fish face the same direction.

3. In a fish-treating apparatus, in combination, at least one fish-holder adapted to hold each fish with either its back or belly facing a given direction, said fish-holder having a gear element, wave transmitting means adapted to direct waves onto each fish in said holder to impinge on the back or belly of the fish, detecting means responsive to the effect produced by the impingement of waves on one but not the other of the back and belly of a fish, and means controlled by said detecting means and having teeth adapted to engage said gear element for turning said holder through 180°.

4. An apparatus according to claim 3 comprising several fish-holders, and a rotary structure by which they are carried and moved past both said transmitter means and said turning means.

5. In a fish-treating apparatus, in combination, a tubular fish-holder adapted to hold each fish with either its back or belly facing a given direction and formed with an opening permitting waves to fall on the back or belly of a fish, said fish-holder having a gear element, wave transmitting means adapted to direct waves onto each fish through said opening, detecting means responsive to the effect produced by impingement of waves on one but not the other of the back and belly of a fish, and means controlled by said detecting means and having teeth adapted to engage said gear element for turning said holder through 180°.

6. An apparatus according to claim 5 in which said tubular fish-holder is vertical and has a gate at the bottom adapted to support the fish during the operation and means are provided for opening the gate to let the fish fall out with its back facing the desired direction.

7. In a fish-treating apparatus, in combination, a rotary structure, means for supplying fish one by one to said rotary structure to be carried thereby in a part-circular path with either the back or belly facing radially outwards, wave transmitting means for directing light waves onto each of said fish during the rotation of said structure to be reflected to a greater or less extent by the belly or back of the fish, light-sensitive means responsive to the greater amount of light reflected by a fish belly, means controlled by said light-sensitive means for turning through 180° all of said fish having their backs facing one direction and means operative after said turning means for releasing said fish from said structure whereby all the fish are released with their backs facing the same direction.

8. In a fish-treating apparatus, in combination, a fish-holder adapted to hold each fish with either its back or belly facing a given direction, means for moving said fish-holder in a predetermined path, wave transmitting means adapted to direct waves onto each fish in said holder at one point in said path to impinge on the back or belly of the fish as the case may be, detecting means responsive to the effect produced by impingement of waves on one but not the other of the back and belly of a fish, means movable into and out of said path to engage said holder and turn it through 180°, and means controlled by said detecting means for moving said movable means into engagement with said holder.

9. In a fish-treating apparatus, a tubular fish-holder adapted to hold a fish with either its back or belly facing a certain direction, a gear element carried by said fish-holder, means moving said fish-holder along a predetermined path, wave-transmitting means adapted to direct waves onto each fish in said holder at one point in said path to impinge on either the back or the belly of a fish, wave-detecting means associated with said wave-transmitting means and adapted to be actuated when the waves directed by the transmitting means are reflected by the belly of a fish, a swingable lever, teeth carried by said lever, magnetic means controlled by detecting means for moving said lever to cause the teeth thereof to engage said gear element while said fish-holder is moving, and resilient means connected with said lever for returning said lever to an inoperative position.

References Cited in the file of this patent

UNITED STATES PATENTS

| Number | Name | Date |
| --- | --- | --- |
| 1,915,028 | Meyer-Jagenberg | June 20, 1933 |
| 1,926,914 | Popov | Sept. 12, 1933 |
| 2,109,505 | Rue | Mar. 1, 1938 |

FOREIGN PATENTS

| Number | Country | Date |
| --- | --- | --- |
| 69,462 | Sweden | May 18, 1930 |
| 73,041 | Sweden | Nov. 3, 1931 |